May 4, 1971  C. H. WOODS  3,577,317
CONTROLLED FUSION REACTOR
Filed May 1, 1969  2 Sheets-Sheet 1
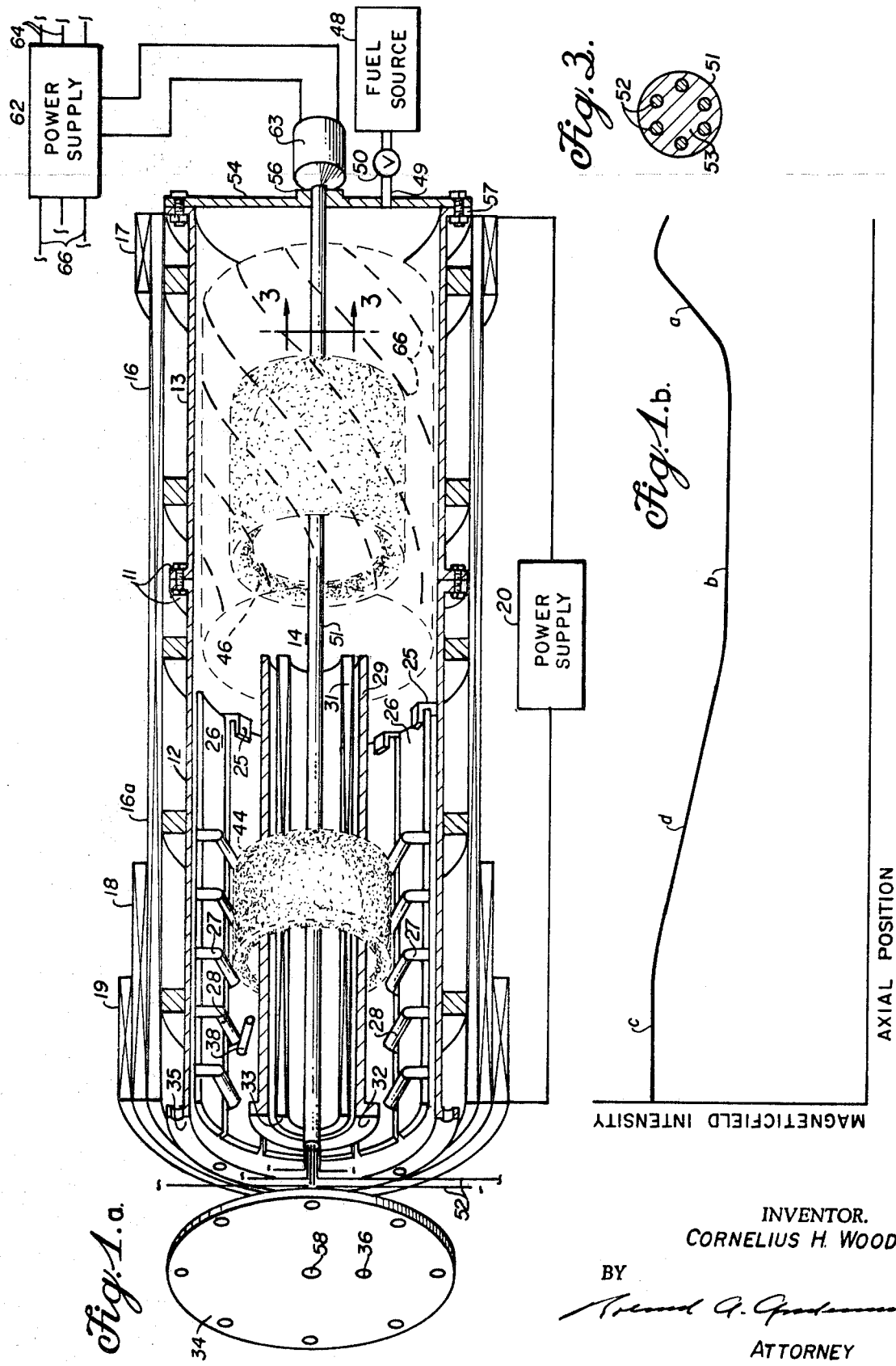
INVENTOR.
CORNELIUS H. WOODS
BY
ATTORNEY

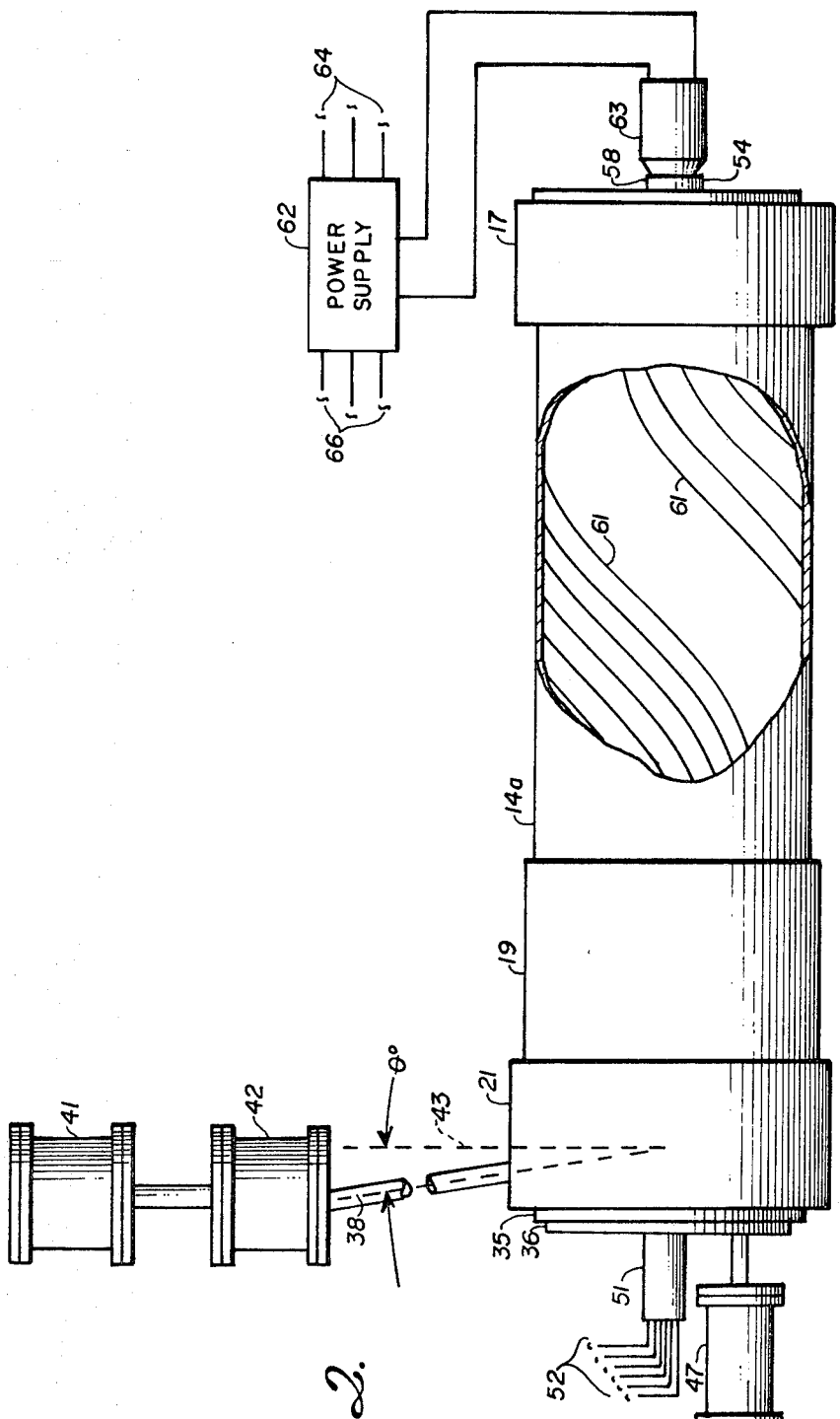

3,577,317
CONTROLLED FUSION REACTOR
Cornelius H. Woods, Livermore, Calif., assignor to the United States of America as represented by the United States Atomic Energy Commission
Filed May 1, 1969, Ser. No. 820,750
Int. Cl. G21b 1/00
U.S. Cl. 176—4                                     8 Claims

ABSTRACT OF THE DISCLOSURE

Controlled fusion reactor of the Astron type having a magnetic containment zone created by the interaction of the magnetic field of a high energy cylindrical layer of charged particles rotating in an axially symmetric magnetic field region in which an additional axial conductor introduces a shear magnetic field component to suppress instabilities which cause plasma loss.

BACKGROUND OF THE INVENTION

This invention was made under, or in the course of, Contract No. W-7405-ENG-48 with the United States Atomic Energy Commission.

FIELD OF THE INVENTION

Devices of the type designed for the production and containment of high temperature charged particle plasmas including those employed for controlled fusion purposes generally employ magnetic fields to effect containment of the charged particles. In U.S. Pat. No. 3,071,525, issued Jan. 1, 1963, to Nicholas C. Christofilos for "Method and Apparatus for Producing Thermonuclear Reactions" there is disclosed such a device. In brief, the aforesaid device of Christofilos, now known generally by the term "Astron," utilizes an elongated axially symmetric magnetic field having terminally intensified magnetic field regions into which relativistic electrons are injected from an external accelerator into terminal regions of the magnetic field and the magnetic field is manipulated so that the electrons are trapped to create a cylindrical E-layer of relativistic electrons rotating about the axis of the field. Under appropriate conditions the magnetic field of said E-layer interacts with the external field creating a system of closed magnetic field lines which effectively defines a containment zone for charged particles. Thereafter, a suitable fuel material is introduced into the magnetic field to be heated, vaporized and ionized by interaction with the electrons of the E-layer creating ions which are trapped and confined in said containment zone. Moreover, in U.S. Pat. No. 3,036,963, issued May 29, 1962, to Nicholas C. Christofilos, there is disclosed an "Astron" type device utilizing a different electron injection system, i.e., one in which annular electron bunches are formed at the peak of one of said magnetic mirror fields and are directed along the decreasing gradient of said magnetic mirror with the magnetic field thereof interacting with resistive loops disposed circumjacent thereto to extract axial kinetic energy therefrom so that the electron bunches are trapped in the potential well between said mirrors to form an E-layer disposed centrally along the axis of said external field.

Instabilities can occur in such magnetic field configurations during formation and containment of high temperature plasma which decrease containment times and thereby decrease the efficiency of containment. A common instability which can possibly occur therein is the so-called "flute" or interchange type which has been described, for example, in Controlled Thermonuclear Reactions, Glasstone and Lovberg, D. Van Nostrand Company, Inc. 1960.

SUMMARY OF THE INVENTION

The present invention relates, in general, to the production and containment of high temperature plasmas and, more particularly, to the stabilization of magnetic containment fields employed for the production and containment of high temperature plasmas including those of interest for use in controlled thermonuclear reactors.

In practicing the invention there may be employed a device constructed in accord with conventional "Astron" reactor practice but in which there is now provided an axial conductor which is energized to create a stabilizing shear magnetic field component in the magnetic field. More particularly, an elongated solenoidal coil having a central linear region of substantially uniform ampere turns distribution and terminal regions of increased ampere turns distribution is energized with electrical current to create, in an evacuated vessel, an axially symmetric magnetic field having a linear central zone of uniform intensity bounded by terminal zones of increased magnetic field intensity. Such a magnetic field is conventionally termed a magnetic mirror field and defines a containment zone for charged particles disposed about the axis of the uniform central field region. Means are provided for introducing highly energetic electrons, i.e. relativistic electrons to form a cylindrical sheath or layer (E-layer) of electrons representing an electron current rotating about the axis in said containment zone. The means used to inject the electrons may be those used in conventional Astron practice or any other equivalent means. The electromagnetic field produced by the electron current of said sheath interacts with the externally applied magnetic field to produce a magnetic field pattern of closed magnetic field lines generally extending in parallel relation longitudinally along the axial regions enclosed by the E-layer and exteriorly along the E-layer with curved end portions enclosing said E-layer when the electron current is of a sufficiently elevated level—thereby defining a plasma containment zone in the vicinity of said E-layer. In conventional practice a fuel material, e.g., neutral gaseous atoms or molecules are introduced into said field and are heated and ionized by interaction with the E-layer electrons to form a plasma trapped in the plasma containment zone provided by the aforesaid interacting magnetic fields.

In accord with the present invention an electrical current conductor is disposed at least along the axis of said magnetic mirror field and is electrically energized to produce a magnetic field component perpendicular to the axis of said magnetic field. This third magnetic field component interacts with the externally applied magnetic field and that of the E-layer to yield a system of magnetic field lines which are sheared, i.e., travel in a helical path about the axis of the magnetic field, at least in the region between said E-layer and said field axis, with a pitch determined by the current intensity passed through the axial conductor. In a further modification, return current conductors may be disposed outwardly of the plasma zone to return the current to the power source. Furthermore, the return conductors may be spaced and disposed to follow a helical path outwardly of said E-layer to thereby create a complementary shear component in at least regions of said plasma containment field exterior to said E-layer. The plasma magnetic field pattern containment zone including a shear component thereby is strongly stabilized so as to effectively eliminate or minimize occurrence of a "flute" instability in the system.

Accordingly, it is an object of the invention to provide an improved magnetic field system for producing and containing a high temperature plasma.

Another object of the invention is to provide a stabilized magnetic containment field in a high temperature plasma device.

Still another object of the invention is to provide for stabilization of a high temperature plasma magnetic containment field of the type produced by a cylindrical layer of energetic electrons rotating in an axially symmetric magnetic field by means of a magnetic field produced by an electrically energized conductor disposed along the axis of said magnetic field.

Other objects and advantageous features of the invention will be apparent from the following description taken in conjunction with the accompanying drawing of which:

FIG. 1, wherein upper portion (a) is a longtiudinal cross-sectional view of a high temperature plasma device in accordance with the invention and wherein lower portion (b) is a graphical illustration of the variation of magnetic field intensity along the axis of the device of FIG. 1a;

FIG. 2 is a plan view of the reactor of FIG. 1 with portions cut away to better show exterior shear field generating current return conductors; and FIG. 3 is a cross-sectional view along the plane 3—3 of FIG. 1 showing the construction of axial conductor 51.

An embodiment of a reactor 10 including a magnetic field stabilization means in accordance with the invention may be constructed, as shown in FIG. 1a, with a cylindrical magnetic field permeable vacuum vessel shell 11 including a first terminal vessel portion 12 in which components of an appropriate electron injector may be disposed and a second portion 13 defining a space 14 in which the plasma containment zone is to be established. To provide an external magnetic field having an intensity distribution within vessel 11, as shown in FIG. 1b, a solenoid having a uniform ampere distribution centrally and increased ampere turns terminally is disposed circumjacent vessel shell 11. More particularly, such solenoid may comprise a uniform ampere turns layered solenoid portion 16 extending along the length of said shell providing uniform central field portion in vessel portion 13 corresponding to region b in FIG. 1b. At the outer end of the second vessel portion a second solenoid portion 17 may overlap the free end of solenoid portion 16 providing an increasing ampere turns distribution providing the intensified magnetic field portion a shown in FIG. 1b.

For purposes of illustration, means for injecting electron rings, for purposes discussed hereinafter, may be provided in injector vessel portion 12 somewhat in the manner described in the aforesaid U.S. Pat. No. 3,036,963. More specifically, over the portion 16a of solenoid 16 extended circumjacent vessel portion 12, there is provided a solenoid portion 18 and a shorter solenoid portion 19, successively overlapping solenoid 16a. This arrangement provides a second magnetic mirror field having a uniform elevated intensity region c and a relatively elongated progressively diminishing intensity region d connecting region c with the end of region b as illustrated in FIG. 1b. The foregoing solenoid portions 16, 16a, 17, 18a and 19 are series connected and energized by means of a direct current power supply 20. With such a magnetic field configuration, region b in vacuum vessel portion 13 constitutes a magnetic field potential well in which charged particles may be trapped under appropriate circumstances.

Resistive loops, distributed concentrically along mirror field region c may be provided, e.g., as by means of metallic mounting strips 26 supported by brackets 25 on the first vessel shell portion, and from which mounting strips inwardly projecting brackets 27 are attached at spaced intervals to support high frequency resistors 28. Single resistive loops are provided by interconnection of each resistor 28, paired supporting brackets 27 and intervening portion of strip 26 which connects bracket ends together and such loops are joined to form a larger coplanar loop coaxially disposed within the first vessel shell portion by connection of the single loops in series peripherally about the circumference of the shell.

For most effective operation the injector includes a non-magnetic barrel 29, enclosing a coaxially disposed solenoid 31, disposed concentrically also with respect to said resistive loops. The solenoid is constructed with a progressively varied turns distribution which act in cooperation with solenoids 16a, 19 and 21, to provide the magnetic mirror field regions c and d as shown in FIG. 2. For support, flanges 32 and 33, on barrel 29 and coil 31, respectively, are bolted to a cover plate 34 which is, in turn, bolted to flange 35 at the end of vessel shell portion 12 as shown in FIG. 3. Passages 36 in plate 34 may provide access to the annular space between shell portion 12 and barrel 31 for vacuum pumping purposes. Vacuum pumping may provide a vacuum pressure of residual background gas of less than about $10^{-6}$ to $10^{-8}$ mm. Hg. However, the plasma forming gas introduced into the vessel may range as high as $10^{16}$ particles per cc., at least.

A magnetic shielding tube 38 is mounted for the purpose of directing high energy electrons from an external source in an approximately azimuthal direction into the annular space between said resistive loops and said barrel 29 in the region c of maximum magnetic mirror field intensity. The external electron source may, for example, include an electron gun 41 and supplemental linear accelerator or induction accelerator 42, as shown in FIG. 1b, delivering high current pulses, e.g., 100 to 1000 amperes or more, and for pulse duration period of 0.05 to 20 or more microseconds of electrons at high energies, e.g., relativistic energies of above about 1.25 mev. to 100 mev. as determined by the rated capacity of the reactor. The repetition rate of the pulses may vary from about 10 cycles to above a few thousand cycles a second. The tube 38 is inclined at a slight angle $\theta°$ to a plane perpendicular to the axis of said magnetic field so that each electron source produces an annular electron bunch 44 disposed about the axis in the region c of said injector region magnetic mirror field and which then moves along barrel 29 through region d.

During transit of region d said resistive loops extract axial momentum energy from said electron bunches 44 so that the electrons of said bunches are trapped in the potential well of said region b of the magnetic field to produce a cylindrical layer or sheath (E-layer) 46 of relativistic electrons rotating about the axis of said magnetic field therein. The electron bunches 44 are generally maintained at near a constant radius as they move along barrel 29 by adjusting the ampere turns distribution along solenoid 31 to maintain Betatron operating conditions therealong. That is the change of flux through the electron bunch must be twice the product of the charge of the guiding field multiplied by the enclosed area. Preferably, the concentric spacing of the resistive loops and electron bunch 39 is at about ⅓ distances between the shell 12 and barrel 29 wherefore certain parameters required for injection can be easily determined by mathematical relationships and other considerations set forth in said U.S. Pat. No. 3,036,963.

For evacuating the reactor vessel a vacuum pump 47 may be connected to perforations 36 in cover plate 34 and others (not shown) might be connected through similar perforations provided in cover plate 34, or elsewhere in the vessel shell as in conventional practice. For supplying a fuel material, e.g., deuterium, helium, tritium, deuterium-tritium mixtures and the like, to be ionized and heated in the containment zone in accord with usual "Astron" operating practice a source 48 of gaseous or other appropriate fuel material may be connected by a conduit 49 entering the vessel, e.g., through cover plate 54 which covers the open end of vessel portion 13. Gas release from source 48 may be regulated and controlled by a valving means 50, to provide an appropriate gas pressure of the magnitude indicated above.

In accordance with the present invention an "Astron" type reactor, of the character described, is provided with containment field stabilizing means including at least one linear electrical conductor member extending along the axis in sequence through said magnetic field regions a, b, d and c and which is energized to provide the shear magnetic field component described above. More particularly, said conductor member may comprise an elongated cylindrical tubular casing 51 constructed of magnetically permeable metal, e.g., nonmagnetic stainless steel, suitable for use in a vacuum environment. A heavily insulated single strand conductor or a bundle of parallel conductor strands 52 embedded in insulation 53 may be disposed in casing 51 as shown in FIG. 3. For continuous operation, where excessive heat might be generated, hollow water cooled conductors can be used or coolant could be circulated through channels (not shown) provided between the insulated conductor strands to remove heat.

In assembling the reactor so as to position the conductor member, cover plate 54 provided with a centrally located perforation 56, may be secured, as shown in FIG. 2, as by bolting to flange 57 provided at the outer end of vessel shell portion 13 with perforation 56 concentric about the axis thereof. Cover plate 34 may be provided with a similarly disposed central perforation 58 so that, when the casing 51 is inserted to project along the vessel axis through perforations 56, 57, the casing is supported by cover plates 54 and 34, respectively. A vacuum tight seal may be effected by welding or brazing the casing to said cover plates, or a vacuum seal may be employed. The vacuum seal may be of the well-known expansible Sylphon bellows type (not shown) which are well-known in the vacuum art. In the event additional support is needed the casing may be supported by spider brackets (not shown) engaging the inner surface of barrel 29. To preserve symmetry and provide support a solenoid barrel similar to solenoid 31 and barrel 29 in the injector portion (not shown) could be provided on cover plate 54 so as to enclose casing 51. The foregoing arrangement provides mutual support for the cantilevered barrels and axial conductor which would be advantageous in an elongated reactor vessel system.

Electrical current from conductors 52, at the injector end 12 of the vacuum vessel may be returned from the injector end of axial conductors 52 by means of a plurality of insulated conductors (not shown) spaced uniformly and extending parallel to the vessel shell. Such an arrangement provides a return current path exerting a minimal effect on the magnetic containment field system. However, it may be preferred to employ a lesser member, e.g., 4 or 6 uniformly spaced parallel conductors which extend longitudinally along vessel 11 and which provide a cusped magnetic field component which can exert a plasma containment stabilizing effect also tending to eliminate plasma diffusion losses. It is even more preferred that a similar number of return conductors 61, i.e., 4 to 6, be provided as shown in FIG. 2 in which said conductors 61 are returned along a helical path along the reactor vessel shell 11 to introduce an additional shear component into the magnetic containment field. The return conductors 61 may therefore be inclined at an angle of from 0° to about 45° inclination with respect to the axis of the vessel 11.

To provide the energizing current, the conductors 52 at one end are connected to one set of terminals of a power supply 62, e.g., in a junction box 63. The return conductors are connected with the second set of terminals 66 of the power supply 62.

In operating the foregoing reactor, the vacuum vessel 11 is evacuated and current is applied from supply 20 to energize the solenoids 16, 17, 18 and 19 to produce a magnetic mirror field having the characteristics described above, with the intensity distribution along the axis of vessel 11 as illustrated in FIG. 1b, within said vacuum vessel. The axial conductor means 52 and return conductors may also be energized initially but may also be energized somewhat later in the operating cycle as a significant plasma density is achieved to provide the stabilizing effect.

Electron beam pulses are now directed from the electron source through tube 38 into the region c of said magnetic field, i.e., substantially tangentially into the space enclosed within solenoid segment 19 wherein the electrons of the beam pulse are curved by the magnetic field to orbit about injector barrel 29. A slight axially inward velocity is imparted to the electrons by inclination of the guide tube 38 wherefore the electrons of the beam pulse accumulate to form an annular electron ring 44 in the uniform intensity portion c of the magnetic field. Each electron ring also has a slight inward velocity which would increase as region d of the magnetic field is traversed except that said resistive loops extract energy from the loops during this time and as a consequence the electron bunches are successively trapped and spread along the axis in the magnetic field region to produce a cylindrical layer (E-layer) of relativistic electrons rotating about the axial conductor member. The interaction of the field produced by the external solenoid with the field produced by the E-layer and with the magnetic field produced by conductor 51 and return conductors 61, if helically wound, creates a magnetic field pattern or a system of magnetic field lines including magnetic field lines 66 which are sheared, i.e., follow a generally helical longitudinal path providing a magnetic shear field component along the length inside and outside of said E-layer. Said magnetic field pattern defines a containment zone in a generally annular region in the vicinity of said E-layer.

Now when an appropriate electrically neutral fuel material is introduced into the magnetic field from the fuel source 48, the atomic particles thereof are ionized and heated by interaction with the energetic electrons of the E-layer whenceforth the product ions and electrons are trapped to form a high temperature plasma confined in said containment zone, the electromagnetic confinement properties of which are stabilized by said helical magnetic shear field lines.

The field strength of region b of the magnetic field as produced by solenoid portion 16 may range from a few hundred gauss to several hundred thousand gauss, e.g., 200 to 250,000 gauss. For laboratory use a field of about 500 gauss can suffice. The peak intensity of the magnetic mirror field regions a and c may be of the order of about 1.05 to 2 or more of the intensity of region b. Usual practice is to employ a magnetic field intensity in regions a and c of about 1.1 to 1.2 times more intense as compared to region b. Electron energies in the relativistic range, i.e., above about 2 mev. are preferred.

The intensity of the initial external magnetic field Bo at any point along the axis of vessel 11 is related to the ampere turns per cm., $i_o$, by the following equation:

$$B_o = \frac{4\pi}{10} i_o \text{ (gauss)}$$

For purposes herein concerned, the uniform field intensity may be used.

The intensity of the magnetic field generated by the E-layer and which opposes the external field is related to the current density/cm. of the E-layer by the following expression:

$$B_{\text{E-layer}} = -\frac{4\pi}{10} i_o \text{ (gauss)}$$

where $i_e$ is the circulating electron current density of the E-layer.

The intensity of the magnetic shear field $Bs$ generated by the current conductor 51 is related to the current flowing therethrough by the following expression:

$$Bs = \frac{2I}{10R} \text{ (B special)}$$

The radial variation of this component of magnetic field accounts for the shear. The effect of the magnetic field of the return conductors 61 can be neglected if said conductors are closely spaced when compared with the radial extension of the E-layer, but when they consist of only a few (for example, six) conductors evenly spaced further shear is produced of a complex type, especially near these conductors.

A wide variety of values for the relative and/or correlated intensity of the magnetic mirror field, the electron current density and associated E-layer field intensity, and the shear field intensities may be used as appropriate for manifold applications known in the art. For example, the E-layer current density may range up to and even above the level at which the magnetic field produced thereby equals or exceeds the value of the external field including the component introduced by the exterior series of conductors. The axial conductor may be energized to provide a field intensity below, approximating or exceeding the field intensity of the other fields in the vicinity thereof. Generally speaking, the more intense the shear field and/or the higher the pitch of the helical (greater curvature) conductors, the greater the stabilizing force within reasonable limits. Plasma densities in the range of $10^9$ to $10^{16}$ particles/cc. and at temperatures of the order of thousands to several hundred million degrees may also be used dependent on the application.

Further details of the construction and operation of an Astron type high temperature plasma device will be made apparent in the following illustration example:

EXAMPLE

Parametric operating conditions, dimensions and design value of a typical Astron modified in accordance with the teachings of the present invention are tabulated hereinafter:

PARAMETERS

| | |
|---|---|
| Electron energy | 5 mev. (nominal). |
| Injected electron current | 200 amps. |
| Pulse length | 0.30 microsecond. |
| Electron beam pulse ratio | 30 to 60 per second. |
| Average current density of injected electron pulses | 0.9 to 1.8 milliamp. |
| Initial bunch length in injector | 120 cm. |
| Final bunch length exiting injector | 30 cm. |
| Electrical current in axial conductor | 30,000 amps. |
| Shear component produced | 20 degrees. |
| Number of return conductors | 6. |
| Helical pitch of return conductors 61 with respect to field axis | 30 degrees. |
| Shear component produced by conductor 61 | 200 gauss. |
| Approximate maximum plasma density, e.g., deuterium or tritium-deuterium mixtures for continuous operation | $2 \times 10^{12}$ cc. |

DIMENSIONS AND DESIGN VALUES

| | |
|---|---|
| Radius of vessel shell | 47 cm. |
| Coplanar resistive loop radius | 37 cm. |
| Final electron bunch radius | 27 cm. |
| E-layer radius average (Inner radius limit 22 cm., outer 32 cm.) | 27 cm. |
| Barrel 29 radius | 17 cm. |
| Resistor 28 length | 15 cm. |
| Resistance of resistor 28 | 10–20 ohms. |
| Number of resistors in coplanar loops | 15. |
| Spacing between coplanar loops | 10 cm. |
| Number of coplanar loops | 60. |
| Length of resistive loop section, i.e., region $d$ FIG. 2 | 500–600 cm. |

While there has been described in the foregoing what may be considered to be preferred embodiments of the invention, modifications therein may be made within the skill of the art without departing from the teachings of the invention and it is intended to cover all such as fall within the scope of the appended claims.

What is claimed is:

1. In apparatus for producing and containing a high temperature gas or plasma, the combination comprising:
    vessel means defining a closed chamber and provided with means for evacuating said chamber;
    solenoidal coil means adapted to be energized by a power supply means, said coil including a central length portion of uniform ampere turns and terminal portions of increased ampere turns distribution for providing a magnetic mirror field having a central uniform intensity field region and intensified field regions disposed along an axis in said chamber;
    electrical conductor means disposed along the axis of said magnetic mirror field including a terminal at each end for applying an electrical current to the conductor for generating a magnetic field which interacts with said magnetic mirror field;
    means for injecting and trapping energetic electrons in said field to form a cylindrical sheath or E-layer of electrons rotating about the axis along the uniform intensity central portion of said magnetic mirror field so that the magnetic field of said E-layer interacting with the magnetic mirror field and with the field of said axial conductor creates a system of magnetic field lines defining a containment zone for charged particles in the vicinity of said E-layer, said system of magnetic field lines including a magnetic shear field component provided by said axial conductor; and
    means for introducing a material into said magnetic field to be ionized and heated by interaction with said energetic electrons to form a high temperature plasma confined in said containment zone.

2. Apparatus as defined in claim 1 wherein a series of electrical conductors are disposed along the length of said vessel exterior to the region occupied by said system of magnetic field and are provided with terminal means at each end for applying an energizing current to provide a magnetic field interacting with the magnetic mirror field and the magnetic field of said E-layer.

3. Apparatus as defined in claim 2 wherein the terminal means at one end of said series of electrical conductors are connected with the terminal at a corresponding end of said axial conductor and an energizing power supply is connected to terminals at the other corresponding ends of said conductors so that the energizing current applied to said axial conductor returns along said series of conductors.

4. Apparatus as defined in claim 3 wherein said means for injecting and trapping electrons in said magnetic mirror field includes accelerator means for injecting a beam of energetic electrons at a slight angle to the axis of one of said intensified magnetic field regions towards said uniform field region and means associated with said one intensified field region for interacting with said injected electrons so that they are trapped at form said E-layer.

5. Apparatus as defined in claim 2 wherein said series of electrical conductors are limited in number and are disposed in spaced relation to provide a cusped magnetic field component interacting with said magnetic mirror and E-layer fields.

6. Apparatus as defined in claim 2 wherein said series of electrical conductors are disposed along parallel helical paths to provide a magnetic shear field component in outer portions of said system of magnetic field lines.

7. Apparatus as defined in claim 5 wherein said series of electrical conductors are disposed in spaced relation along parallel helical paths to provide a cusped magnetic shear field component in outer portions of said system of magnetic field lines.

8. Apparatus as defined in claim 4 wherein said series of conductors are of a limited number in the range of substantially 4 to 6.

References Cited

UNITED STATES PATENTS

| 3,071,525 | 1/1963 | Christofilos | 176—4 |
| 3,036,963 | 5/1962 | Christofilos | 176—4 |

REUBEN EPSTEIN, Primary Examiner

U.S. Cl. X.R.

315—111